United States Patent
Westell

[11] 3,770,961
[45] Nov. 6, 1973

[54] LIQUID CRYSTAL IMAGING SYSTEM
[75] Inventor: William E. Westell, Boston, Mass.
[73] Assignee: Baird-Atomic, Inc., Bedford, Mass.
[22] Filed: Nov. 24, 1972
[21] Appl. No.: 309,287

Related U.S. Application Data
[63] Continuation of Ser. No. 109,180, Jan. 25, 1971, abandoned.

[52] U.S. Cl. ........... 250/331, 350/2, 350/9, 350/27, 350/160 P, 350/160 LC, 350/175 E, 356/45
[51] Int. Cl. .............................................. G02f 1/16
[58] Field of Search ................... 250/83 R, 83.3 HP, 250/208, 209, 238; 350/78, 160 R, 160 P, 160 LC; 356/45

[56] References Cited
UNITED STATES PATENTS
3,569,709   3/1971   Wank................................. 250/83.3
2,792,484   5/1957   Gurewitsch et al............. 250/209 X

*Primary Examiner*—Edward S. Bauer
*Attorney*—Herbert L. Bello et al.

[57] ABSTRACT

Infrared radiation is imaged on a film of liquid crystal whose characteristic color is a function of its absolute temperature. A heat exchanger in juxtaposition with the liquid crystal is provided for maintaining the ambient temperature of the liquid crystal at the temperature of maximum sensitivity to infrared radiation. A remote sensor responsive to the characteristic color of the liquid crystal controls the heating and cooling cycles of the heat exchanger. In consequence, the liquid crystal is maintained at the temperature of maximum sensitivity by remote sensing of color balance over the entire useful area of the film.

8 Claims, 5 Drawing Figures

PATENTED NOV 6 1973 3,770,961

INVENTOR.
WILLIAM E. WESTELL
BY
Morse, Altman & Oates
ATTORNEYS

LIQUID CRYSTAL IMAGING SYSTEM

This is a continuation of application Ser. No. 109,180, filed Jan. 25, 1971 and now abandoned.

BACKGROUND OF THE INVENTION

1. Field of Invention

The present invention relates to radiometry and, more particularly, to an infrared radiation liquid crystal imaging system.

2. Description of the Prior Art

One type of infrared viewing apparatus involves vapor deposition of a thin oil film on a membrane in a vacuum. A visible image is formed by the interaction of the infrared energy and the oil film for viewing. The sensitivity of this type apparatus has suffered from the disadvantage that it is limited by the physics of the technique combined with practical response time.

SUMMARY OF THE INVENTION

The present invention provides a method and an apparatus for presenting a highly contrasted visual representation established by focusing an infrared radiation pattern on a liquid crystal having a characteristic color and a sensitivity to infrared radiation as a function of its ambient temperature.

The method for presenting the highly contrasted visual representation on the liquid crystal is comprised of the steps of sensing the characteristic color of liquid crystal and maintaining the liquid crystal at its temperature of maximum sensitivity to infrared radiation by controlling the cooling and heating cycles of a heat exchanger in juxtaposition with the liquid crystal as a function of the sensed characteristic color.

The liquid crystal imaging apparatus is characterized by a reflector for focusing in infrared radiation pattern on a film of liquid crystal having a characteristic color as a function of its absolute temperature, a heat exchanger for controlling the ambient thermal environment of the liquid crystal and viewing optics for presenting a visual representation of the infrared radiation pattern focused on the film, the liquid crystal being maintained at the temperature of maximum sensitivity by remote sensing of color balance over the entire useful area of the film. The combination of reflector, liquid crystal, heat exchanger, remote sensor and viewing optics is such as to provide an infrared imaging system of high sensitivity.

The invention accordingly comprises the method steps and apparatus possessing the construction and combination of elements, and arrangement of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in conjunction with the accompanying drawings wherein.

DETAILED DESCRIPTION OF THE PREFERRED EMBODIMENT

Figure 1:
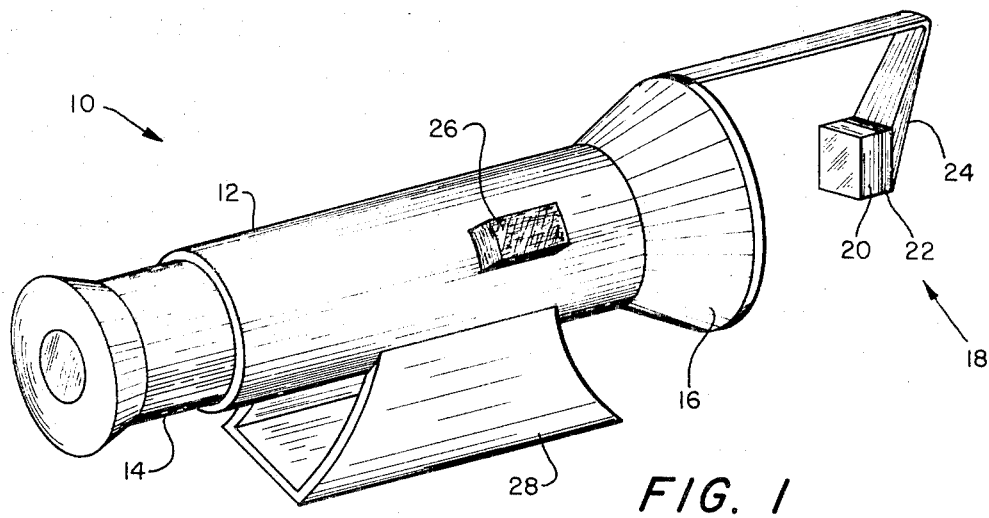
FIG. 1 is a perspective of an apparatus embodying the present invention.
Figure 2:
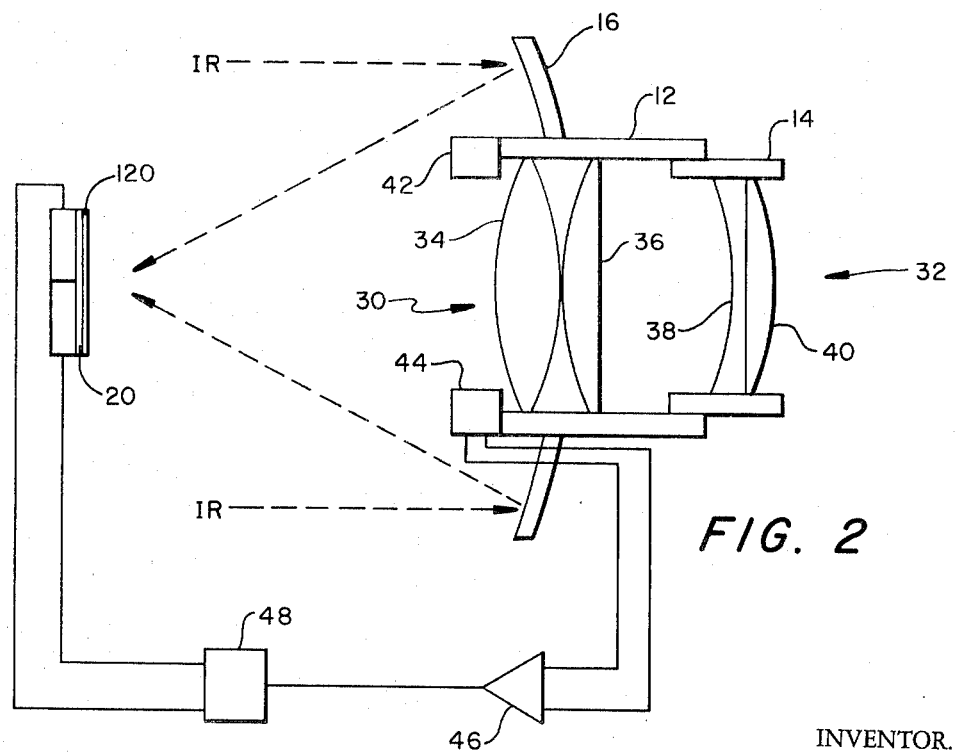
FIG. 2 is a schematic diagram, somewhat perspective, of the apparatus of FIG. 1.

Generally, the apparatus of FIGS. 1 and 2, for example a telescopic device 10, is comprised of a cylindrical body 12 having a carriage 14 reciprocally mounted at one end and a reflector 16 affixed to the other end; a housing 18, having a liquid crystal film 20 and a heat exchanger 22 mounted therein, is supported in spatial relationship with the longitudinal axis of the body 12 at the focal point of reflector 16 by a bracket 24 which is attached to body 12; and a sensing assembly 26 electrically communicating with heat exchanger 22 and optically communicating with liquid crystal film 20. A base 28 is attached to body 12 for supporting the telescopic device.

An objective lens 30 and an eyepiece 32 are mounted within body 12 and carriage 14, respectively. Objective lens 30 includes biconvex and planoconvex lenses 34 and 36, respectively, and eyepiece 32 includes planoconcave and planoconvex lenses 38 and 40, respectively.

Figure 3:
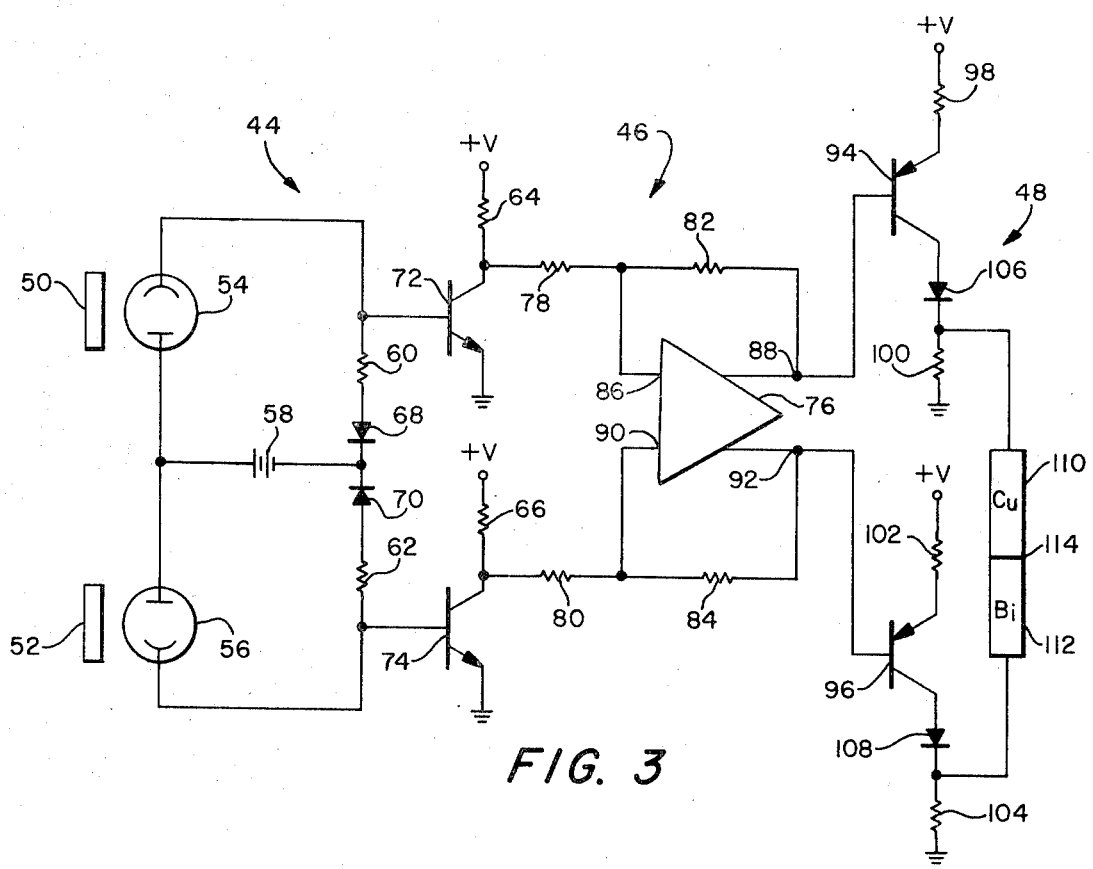
FIG. 3 is a schematic diagram of the remote sensor of FIG. 2.

Sensing assembly 26 includes a light source 42, a detector 44, a differential amplifier network 46 and a switching network 48. Light source 42, for example a white light source, illuminates the image plane for viewing of liquid crystal film 20 which exhibits a characteristic color when viewed in white light. The details of detector 44, differential amplifier 46 and switching network 48 are shown in FIG. 3.

Detector 44 includes optical filters 50, 52; phototubes 54, 56; a power source 58; resistors 60, 62, 64, 66; diodes 68, 70; and transistors 72, 74. Optical filter 50 is interposed between phototube 54 and liquid crystal film 20 and optical filter 52 is interposed between phototube 56 and liquid crystal film 20. Each phototube is responsive to a different wavelength of light as specified by the correlative optical filter, i.e., each phototube selectively generates an output signal in response to the characteristic color of liquid crystal 20.

The photocathode of each phototube 54 and 56 is connected to a positive potential as at one of the outputs of power source 58 and the anode of each phototube 54 and 56 is connected to one side of each resistor 60 and 62, respectively. The other side of each resistor 60 and 62 is connected to a negative potential as at the other output of power supply 58 through diodes 68 and 70, respectively. The anode of each phototube 54 and 56 is connected also to the base of transistors 72 and 74, respectively. The collector of transistor 72 is connected to a positive voltage through resistor 64 and the emitter of transistor 72 is connected to ground. The collector of transistor 74 is connected to a positive voltage through resistor 64 and the emitter of transistor 74 is connected to ground. The signal as at the collector of each transistor 72 and 74 is applied to differential amplifier network 46.

Differential amplifier network 46 includes an operational amplifier 76, input resistors 78, 80 and feedback resistors 82, 84. One side of resistor 78 is connected to the junction of resistor 64 and the collector of transistor 72 and the other side is connected to inverting input 86 of amplifier 76. Feedback resistor 82 is connected serially between input 86 and an output 88 of amplifier 76. One side of resistor 80 is connected to the junction of resistor 66 and the collector of transistor 74 and the other side is connected to non-inverting input 90 of amplifier 76. When the voltage as at input 86 is more positive than the voltage as at input 90, the voltage as at output 92 is more positive that the voltage as at output 88 and vice versa. The signals as at the outputs of differential amplifier network 46 are applied to switching network 48.

Switching network 48 includes transistors 94, 96; resistors 98, 100, 102, 104; and diodes 106, 108. Outputs 88 and 92 of amplifier 76 are connected to the bases of transistors 94 and 96, respectively. The emitter of each transistor 94 and 96 is connected to a positive voltage through resistors 98 and 102, respectively. The collector of transistor 94 is connected to ground through a diode 106 and resistor 100; the collector of transistor 96 is connected to ground through diode 108 and resistor 104. The junction of the cathode of diode 106 and resistor 100 and the junction of the cathode of diode 108 and resistor 104 are connected individually to heat exchanger 22.

In the preferred embodiment, heat exchanger 22 is a thermoelectric device exhibiting the Peltier effect. In one example, heat exchanger 22 is a thermocouple having a copper section 110 and a bismuth section 112 joined at a junction 114. When current flows from copper section 110 to bismuth section 112 a temperature rise is produced and a temperature drop is produce when current flows from bismuth section 112 to copper section 110. The junction of the cathode of diode 106 and resistor 100 is connected to copper section 110 and the junction of the cathode of diode 108 and resistor 104 is connected to bismuth section 112.

The function of sensing assembly 26 is to maintain liquid crystal film 20 at a specific temperature. Liquid crystal film 20, for example a cholesteric liquid crystal, exhibits a characteristic color as a function of its absolute temperature. In addition, the sensitivity of cholesteric liquid crystal to infrared radiation is a function of its absolute temperature. The cholesteric liquid crystal has a spatial resolution of fifty lines per millimeter and a time constant of one-tenth of a second. Accordingly, by maintaining the cholesteric liquid crystal at the temperature of maximum sensitivity a highly contrasted visible representation of the infrared radiation focused on the liquid crystal film is presented on the liquid crystal film. The visible image presented on liquid crystal film 20 is viewed through objective lens 30 and eyepiece 32, carriage 14 being adjusted so that a sharp image appears at eyepiece 34. For a fuller understanding of the method of maintaining the cholesteric liquid crystal at the temperature of maximum sensitivity, reference is made to the following illustrative example.

Figure 4:
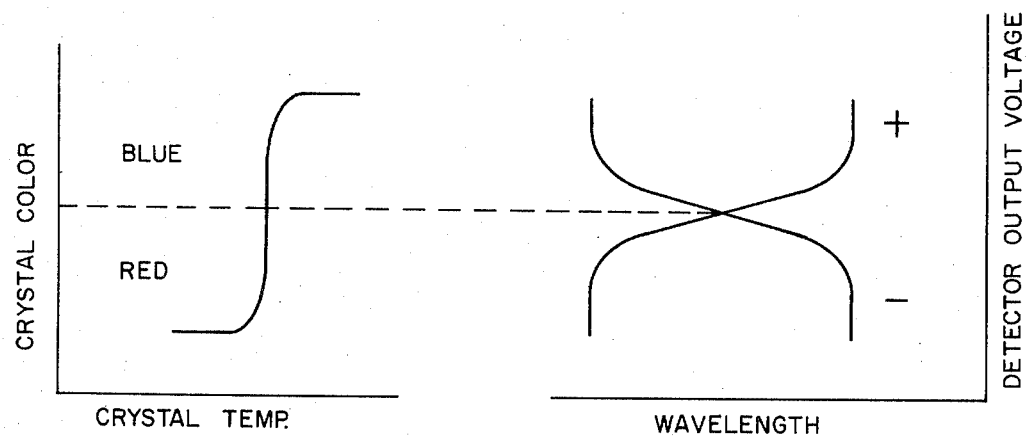
FIG. 4(A) is a graphic representation illustrating the response curve of the liquid crystal.
FIG. 4(B) is a graphic representation illustrating the detector response curves.

By way of example, in the graphic representations illustrated in FIG. 4, cholesteric liquid crystal film 20 is a cholteryl olyel carbonate crystal which exhibits characteristic colors of red and blue, and has a temperature sensitivity of $10^{-3}$ to $10^{-4}$ degrees centigrade, the temperature of maximum sensitivity occurring at the crossover frequency. Cholesteryl olyel carbonate crystal 20 is a thin film, approximately 5 to 30 micons in thickness, which is applied to a thin film thermal insulating dielectric 120, for example, a polyester film such as a polyethylene terephthalate resin. Optical filters 50 and 52 are such that phototubes 54 and 56 are responsive to the red and blue characteristic colors of liquid crystal 20, respectively. That is, filter 50 is such that the output of phototube 54 increases as wavelength increases and filter 52 is such that the output of phototube 56 increases as wavelength decreases. For best results, the rate of change of filters 50 and 52 corresponds to the rate of change of crystal 20. If the temperature of liquid crystal 20 falls below the temperature of maximum sensitivity, the characteristic color of liquid crystal is red. When the characteristic color of liquid crystal 20 is red, the voltage as at the junction of the anode of phototube 54 and resistor 60 is positive, whereby transistor 72 conducts. In consequence of transistor 72 conducting, the voltage at the junction of resistors 64 and 78 rises. Since phototubes 56 is not responsive to the color red, transistor 74 is cut-off. Accordingly, the voltage at inverting input 86 is more positive than the voltage as at non-inverting input 90, whereby the voltage as at output 88 is negative with respect to the voltage as at output 92. In consequence of the negative voltage at the base of transistor 94 and the positive voltage as at the base of transistor 96, transistor 94 is in a conducting state and transistor 96 is in a non-conducting state. When transistor 94 conducts, current flows through diode 106, copper section 110, bismuth section 112 and resistor 104 to ground. As previously stated, when current flows from copper section 110 to bismuth section 112 a temperature rise is produced. Current continues to flow from the copper section to the bismuth section until the temperature of liquid crystal 20 is at the temperature of maximum sensitivity. It will be readily appreciated that, when the temperature of liquid crystal 20 rises above the temperature of maximum sensitivity, current will flow from bismuth section 112 to copper section 110, in consequence liquid crystal will be cooled to the temperature of maximum sensitivity.

Accordingly, liquid crystal 20 is maintained at a temperature of maximum sensitivity to infrared radiation by remote sensing of color balance.

In an alternate embodiment, heat exchanger 22 is other than a thermoelectric device exhibiting the Peltier effect, for example, a black body or thermal radiation source such as an illumination source as shown at 42. In this case, switching network 48 is connected to source 42 and controls the thermal radiation emitted therefrom.

Since certain changes may be made in the illustrated embodiment without departing from the scope of the present invention herein involved, it is intended that all matter contained in the foregoing disclosure and depicted in the accompanying drawings be construed in an illustrative and not in a limiting sense.

What is claimed is:

1. An apparatus for presenting a highly contrasted visual representation of an infrared radiation pattern comprising:
    a. liquid crystal means having a characteristic color and a sensitivity to infrared radiation as a function of its absolute temperature;
    b. means for focusing infrared radiation on said liquid crystal means, an infrared radiation image presented on said liquid crystal means by said infrared radiation focused thereon;
    c. heat exchanger means producing a temperature rise and a temperature drop, said heat exchanger means operatively connected to said liquid crystal means for controlling the heating and cooling of said liquid crystal means at a rate greater than the heating and cooling rate produced by the ambient temperature about said liquid crystal means; and d. sensing means electrically connected to said heat exchanger means and optically communicating with said liquid crystal means, said sensing means sensing the characteristic color of said liquid crystal means and generating output signals related to the sensed characteristic color of said liquid crystal, said heat exchanger means responsive to said output signals generated by said sensing means, said liquid crystal means heated and cooled by said heat exchanger means, said liquid crystal means maintained at its absolute temperature of maximum sensitivity to infrared radiation by said heat exchanger means.

2. The apparatus as claimed in claim 1 wherein said focusing means is a reflector.

3. The apparatus as claimed in claim 1 wherein said heat exchanger is a thermocouple exhibiting a Peltier effect.

4. The apparatus as claimed in claim 1 wherein said sensing means includes:
   light source means;
   b. detecting means responsive to the characteristic color of said liquid crystal;
   c. a differential amplifier electrically connected to said detecting means; and
   d. switch means electrically connected to said differential amplifier means and said heat exchanger.

5. The apparatus as claimed in claim 4 wherein said detecting means includes:
   a. a first phototube;
   b. a first optical filter optically interposed between said first phototube and said liquid crystal means;
   c. a second phototube; and
   d. a second optical filter optically interposed between said second phototube and said liquid crystal means.

6. The apparatus as claimed in claim 1 wherein said liquid crystal means is a cholesteric liquid crystal.

7. An apparatus for presenting a highly contrasted visual representation of an infrared radiation pattern comprising:
   a. a body;
   b. a carriage reciprocally mounted to said body at one end thereof;
   c. an objective lens mounted in said body;
   d. an eyepiece mounted in said carriage;
   e. focusing means mounted to said body at the other end thereof;
   f. liquid crystal means operatively connected to said focusing means at the focal point of said focusing means, infrared radiation focused on said liquid crystal means by said focusing means, said liquid crystal means having a characteristic color and a sensitivity to infrared radiation as a function of its absolute temperature, an infrared radiation image presented on said liquid crystal means by infrared radiation focused thereon;
   g. a heat exchanger producing a temperature rise and a temperature drop at a rate greater than the rate of temperature rise and temperature drop produced by ambient temperature, said heat exchanger means operatively connected to said liquid crystal means for controlling the temperature of said liquid crystal means; and
   h. sensing means electrically connected to said heat exchanger and optically communicating with said liquid crystal means, said sensing means sensing the characteristic color of said liquid crystal means and generating output signals as a function of the sensed characteristic color of said liquid crystal means, said heat exchanger responsive to said output signals generated by said sensing means, said liquid crystal means heated and cooled by said heat exchanger at a rate which is greater than the heating and cooling rate provided by the ambient temperature about said liquid crystal means, said liquid crystal means maintained at its absolute temperature of maximum sensitivity to infrared radiation by said heat exchanger.

8. A method of maintaining a liquid crystal at a specific temperature, said liquid crystal having a characteristic color as a function of its temperature, said method comprising the steps of:
   a. sensing a predetermined characteristic color of said liquid crystal;
   b. generating control signals related to said sensed characteristic color; and
   c. heating and cooling said liquid crystal at a rate which is greater than the ambient temperature heating and cooling rate in response to said control signals for maintaining said lqiuid crystal at said predetermined characteristic color, said specific temperature defined by said determined characteristic color.

* * * * *